(12) United States Patent  (10) Patent No.: US 8,507,142 B2
Muramatsu  (45) Date of Patent: Aug. 13, 2013

(54) FUEL CELL SYSTEM INCLUDING CHARGE STATUS DETECTOR AND OPERATION METHOD THEREFOR

(75) Inventor: Yasuyuki Muramatsu, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1079 days.

(21) Appl. No.: 11/752,613

(22) Filed: May 23, 2007

(65) Prior Publication Data

US 2007/0275272 A1  Nov. 29, 2007

(30) Foreign Application Priority Data

May 23, 2006  (JP) ................................. 2006-143435

(51) Int. Cl.
*H01M 8/04* (2006.01)
(52) U.S. Cl.
USPC ............ 429/430; 429/400; 429/428; 429/429
(58) Field of Classification Search
None
See application file for complete search history.

(56) References Cited

U.S. PATENT DOCUMENTS

| | | | |
|---|---|---|---|
| 5,631,532 A | 5/1997 | Azuma et al. | |
| 5,656,919 A * | 8/1997 | Proctor et al. | 320/153 |
| 6,158,537 A | 12/2000 | Nonobe | |
| 6,781,343 B1 | 8/2004 | Demachi et al. | |
| 2002/0162694 A1* | 11/2002 | Iwasaki | 180/65.3 |
| 2004/0018399 A1* | 1/2004 | Jung | 429/9 |
| 2004/0048118 A1 | 3/2004 | Nakaji et al. | |
| 2004/0183501 A1 | 9/2004 | Ozeki | |

FOREIGN PATENT DOCUMENTS

| | | |
|---|---|---|
| EP | 1 453 134 A1 | 9/2004 |
| JP | 10-040931 A | 2/1998 |
| JP | 2003-151600 A | 5/2003 |
| JP | 2004-040868 A | 2/2004 |
| JP | 2004-103317 A | 4/2004 |
| JP | 2004-146075 A | 5/2004 |
| JP | 2004-227832 A | 8/2004 |
| JP | 2004-253189 A | 9/2004 |
| JP | 2004-254454 A | 9/2004 |
| JP | 2005-135666 A | 5/2005 |
| JP | 2006-054976 A | 2/2006 |
| JP | 2006-106887 A | 4/2006 |

OTHER PUBLICATIONS

Official Communication issued in corresponding European Patent Application No. 07010094.6, mailed on Mar. 7, 2011.

\* cited by examiner

*Primary Examiner* — Ula C Ruddock
*Assistant Examiner* — Tony Chuo
(74) *Attorney, Agent, or Firm* — Keating & Bennett, LLP

(57) ABSTRACT

A fuel cell system includes a cell stack, a secondary battery, and a controller including a CPU, a main switch, and a stop button. After the main switch is turned OFF, if there is no power generation stopping command from the stop button, the CPU stops power generation in the cell stack after continuing power generation in the cell stack until a charge rate of the secondary battery becomes not lower than a first threshold value. If the charge rate is not lower than a second threshold value and is lower than the first threshold value, generation in the cell stack is stopped in response to the power generation stopping command from the stop button. If the charge rate is lower than the second threshold value, power generation in the cell stack is continued to charge the secondary battery until the charge rate becomes not lower than the second threshold value.

10 Claims, 10 Drawing Sheets

F I G. 9
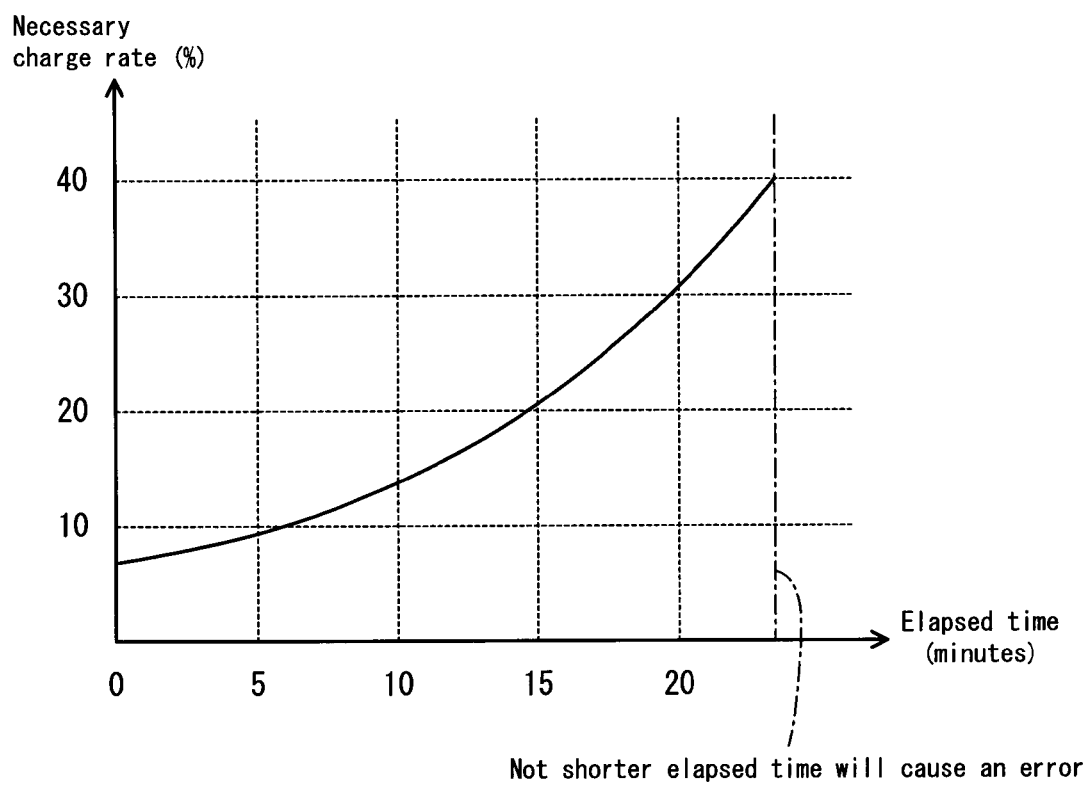

FUEL CELL SYSTEM INCLUDING CHARGE STATUS DETECTOR AND OPERATION METHOD THEREFOR

BACKGROUND OF THE INVENTION

1. Field of the Invention

The present invention relates to fuel cell systems and operation methods therefor. More specifically, the present invention relates to fuel cell systems and operation methods therefor where power generation in the fuel cell is continued even after receiving an operation stop command, in order to charge a secondary battery if the secondary battery has not been charged to a predetermined extent.

2. Description of the Related Art

Fuel cell systems mounted on transportation equipment and electronic apparatuses make use of a secondary battery for driving system components in order to start power generation in the fuel cells. In these fuel cell systems, it is a common practice to continue power generating operation in the fuel cells even after receiving an operation stop command if the secondary battery has not been charged to a predetermined threshold. By charging the secondary batteries in this way, these systems can make a reliable transfer to normal operation where uninterrupted normal power generation takes place, when the system is turned on next time.

An example of a conventional device of this kind is disclosed in JP-A 2004-227832 (Patent Document 1), for example. Specifically, the document discloses a technique whereby power generation by the fuel cells is forcibly terminated even during a battery charging operation after an operation stop command is received. Stopping the power generation in the fuel cells, i.e. stopping the charging of the secondary battery, increases convenience of the system operator since the operator no longer has to wait until the charging is complete after issuing the operation stop command.

However, since it is possible to abort charging after the operation stop command is issued, the technique according to Patent Document 1 poses a risk that the amount of charge stored in the secondary battery will be depleted in the next cycle of operation, before the fuel cell's output covers the system's power consumption. This means that the fuel cells become unable to sustain power generation, and the fuel cell system ceases its operation before entering into normal operation.

SUMMARY OF THE INVENTION

In order to overcome the problems described above, preferred embodiments of the present invention provide a fuel cell system and operation method therefor capable of ensuring transfer to normal operation while maintaining convenience.

According to a preferred embodiment of the present invention, a fuel cell system includes a fuel cell, a secondary battery charged by the fuel cell, a charge status detector arranged to detect a charge status of the secondary battery, a controller arranged to continue power generation in the fuel cell after the fuel cell starts power generation, until a result of detection by the charge status detector is not lower than a first threshold value, before stopping power generation in the fuel cell; and an instruction unit arranged to stop power generation in the fuel cell. The controller stops power generation in the fuel cell based on a power generation stopping command from the instruction unit if a result of detection by the charge status detector is lower than the first threshold value and not lower than a second threshold value.

According to another preferred embodiment of the present invention, a method of operating a fuel cell system including a secondary battery charged by a fuel cell, is performed such that power generation in the fuel cell is stopped after the secondary battery is charged to a charge status not lower than a first threshold value under an absence of a power generation stopping command from an instruction unit, whereas power generation in the fuel cell is stopped in response to the power generation stopping command from the instruction unit if the charge status of the secondary battery is lower than the first threshold value and not lower than a second threshold value.

According to a preferred embodiment of the present invention, if there is no power generation stopping command from the instruction unit, power generation in the fuel cell is stopped after the secondary battery has been charged until a result of charge status detection into the secondary battery shows a value not lower than the first threshold value. On the other hand, power generation in the fuel cell is stopped in response to a power generation stopping command from the instruction unit if a result of charge status detection into the secondary battery shows a value not lower than the second threshold value (which represents an amount of charge necessary for the secondary battery in the next system operation, from the time when the operation is started to the time when an equilibrium is reached between charging and discharging; the value is smaller than the first threshold value) and lower than the first threshold value. Since charging can be stopped before it is completed, operator convenience is maintained. Further, if a result of charge status detection into the secondary battery shows a value lower than the second threshold value, power generation in the fuel cell is continued whereby the secondary battery is charged until the charge status shows a value not lower than the second threshold value even if the instruction unit provides a normal power generation stopping command (i.e., the same power generation stopping command as issued when a result of charge status detection shows a value not lower than the second threshold value and lower than the first threshold value). This assures that the system can transfer to its normal operation in the next operation.

Preferably, the fuel cell system further includes a determination unit arranged to determine if the fuel cell system is connected with an external power source so as to charge the secondary battery, and the controller stops power generation in the fuel cell if the determination unit determines that the external power source is connected with the fuel cell system. In this case, power generation in the fuel cell is stopped when the fuel cell system is connected with an external power source, and the secondary battery is charged with electricity from the external power source. Prioritizing the charging by an external power source as described enables to reduce the amount of fuel which must be replenished to the fuel cell, thereby saving the fuel.

Further preferably, the controller stops power generation in the fuel cell if the determination unit determines that the external power source is connected with the fuel cell system and a result of detection by the charge status detector is lower than a first threshold value and not lower than a second threshold value. This arrangement assures that the system can start next time, even in case the external charging failed due to power failure for example.

Further, preferably, the fuel cell system includes a setting unit arranged to set the second threshold value based on information concerning an amount of charge necessary for the secondary battery from a time when operation is started to a time when an equilibrium is reached between charging and discharging in the secondary battery. In this case, the second threshold value can be set every time the system is operated, and therefore it is possible to make a setting for the amount of charge in the secondary battery accurately to a value which is actually necessary in the next operation while it is also possible in the current operation to stop power generation in the fuel cell at an appropriate timing in response to the command from the instruction unit.

A larger output from the fuel cell enables the system to cover more quickly the amount of power necessary for driving the fuel cell system by the output from the fuel cell alone. Therefore, the amount of charge necessary for the secondary battery from the time when system is started to the time when an equilibrium is reached between charging and discharging in the next operation is small if the output of the fuel cell is large whereas the amount is large if the output of the fuel cell is small. According to preferred embodiments of the present invention, preferably, the fuel cell system further includes an output information detector arranged to detect information concerning an output of the fuel cell, and the information concerning the necessary amount of charge includes the information concerning an output of the fuel cell detected by the output information detector. In this case, the second threshold value is set by using the information concerning an output of the fuel cell. Setting the second threshold value using information concerning an output of the fuel cell as described enables to set the second threshold value appropriately in accordance with the output characteristic of the fuel cell.

It is not possible to tap a sufficient amount of electricity from the fuel cell until the temperature of the fuel cell rises to a certain extent. Therefore, the amount of charge necessary for the secondary battery from the time when the system is started to the time when an equilibrium is reached between charging and discharging in the next operation is small if the ambient temperature is high whereas the amount is large if the ambient temperature is low. According to preferred embodiments of the present invention, preferably, the fuel cell system further includes an ambient temperature detector arranged to detect an ambient temperature, and the information concerning the necessary amount of charge includes the ambient temperature detected by the ambient temperature detector. In this case, the second threshold value is set by using the ambient temperature. Setting the second threshold value by using the ambient temperature as described provides an advantage that an appropriate second threshold value suited to the external environment can be set if a difference in the ambient temperature between the current operation and the next operation is small.

If a long time elapses from the time when power generation is started to the time when an equilibrium is reached between charging and discharging in the secondary battery, a large amount of electric power is consumed by the fuel cell system until the equilibrium is reached between charging and discharging in the secondary battery. Therefore, the amount of charge necessary for the secondary battery from the time when the system is started to the time when an equilibrium is reached between charging and discharging in the next operation is large if the elapsed time is long whereas the amount is small if the elapsed time is short. According to preferred embodiments of the present invention, preferably, the fuel cell system further includes a time measurement unit arranged to detect a time elapsed from a time when power generation operation is started to a time when an equilibrium is reached between charging and discharging in the secondary battery, and the information concerning the necessary amount of charge includes the elapsed time measured by the time measurement unit. In this case, the second threshold value is set by using the elapsed time. Setting the second threshold value by using the elapsed time as described enables to set an appropriate second threshold value easily.

Preferably, the fuel cell system further includes a notification unit arranged to provide notification of whether or not power generation in the fuel cell can be stopped in response to a power generation stopping command from the instruction unit. In this case, it is possible to reduce an amount of time for the operator to spend for waiting, by letting the operator know if power generation in the fuel cell can be stopped in response to a power generation stopping command from the instruction unit.

Transportation equipment is not always stopped at a place where an external power supply is available. Since preferred embodiments of the present invention assures a successful transfer to normal operation when the system is started next time while maintaining operator convenience, preferred embodiments of the present invention can be utilized suitably to transportation equipment.

The above-described and other elements, characteristics, features, steps, aspects and advantages of the present invention will become clearer from the following detailed description of preferred embodiments to be made with reference to the attached drawings.

BRIEF DESCRIPTION OF THE DRAWINGS

FIG. 9 is a graph showing a charge rate required of the secondary battery for an amount of elapsed time.

DETAILED DESCRIPTION OF PREFERRED EMBODIMENTS

Hereinafter, preferred embodiments of the present invention will be described, with reference to the drawings. The preferred embodiments are cases in which a fuel cell system 100 according to the present invention is equipped in a motorbike 10 as an example of transportation equipment.

The description will first cover the motorbike 10. It is noted that the terms left and right, front and rear, up and down as used in the preferred embodiments of the present invention are determined from the normal state of riding, i.e., as viewed by the driver sitting on the driver's seat of the motorbike 10, with the driver facing toward a handle 24.

Figure 1:
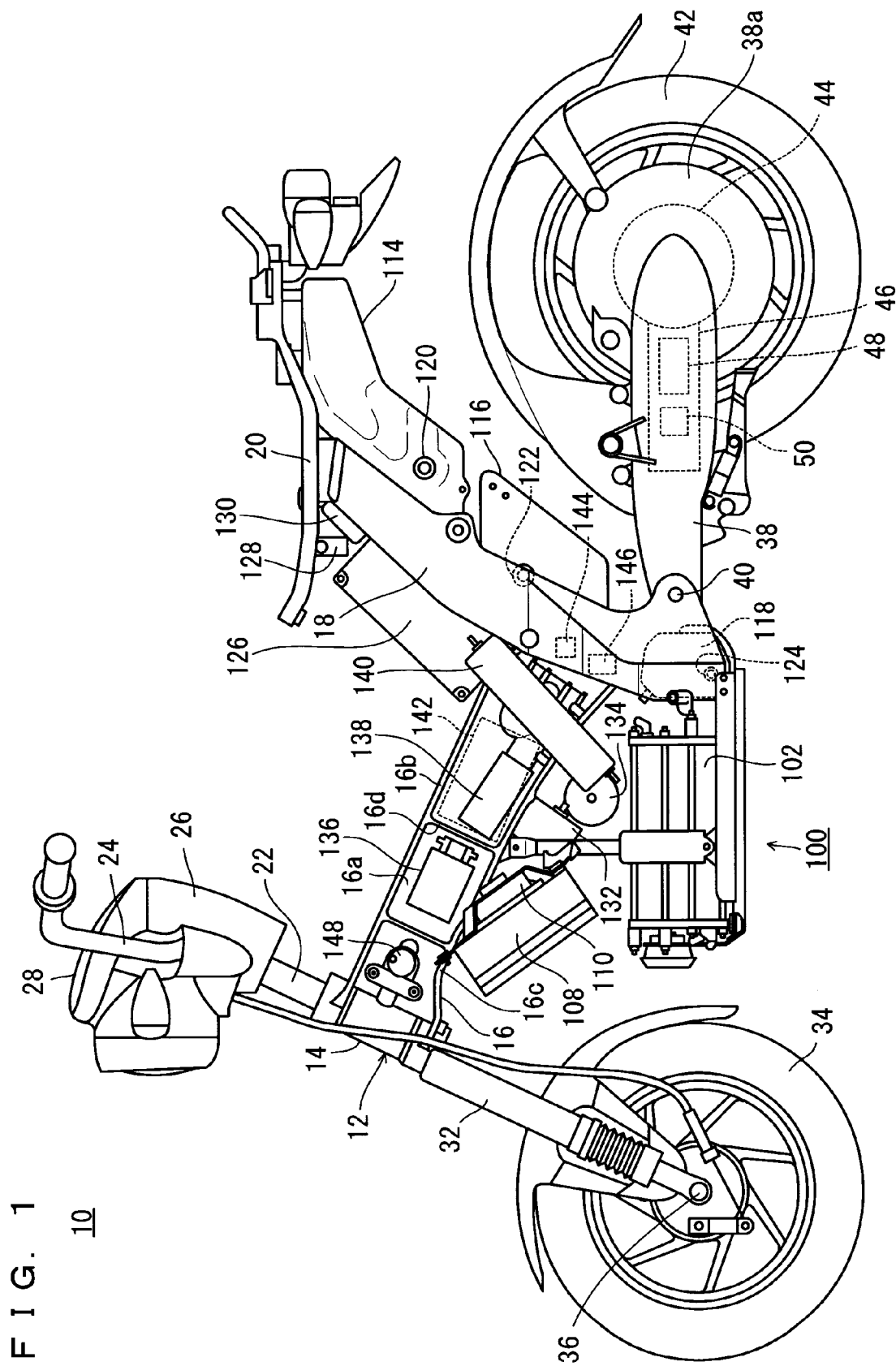
FIG. 1 is a left side view of a motorbike according to a preferred embodiment of the present invention.

Referring to FIG. 1, the motorbike 10 includes a vehicle frame 12. The vehicle frame 12 has a head pipe 14, a front frame 16 which has an I-shaped vertical section and extends in a rearward and downward direction from the head pipe 14, a rear frame 18 which is connected with a rear end of the front frame 16 and rising in a rearward and upward direction, and a seat rail 20 which is attached to a top end of the rear frame 18.

The front frame 16 preferably includes a plate member 16a which has a width in the vertical directions and extends in a rearward and downward direction, substantially perpendicularly to the lateral directions of the vehicle; flanges 16b, 16c which are formed respectively at an upper end edge and a lower end edge of the plate member 16a, extend in a rearward and downward direction and have a width in the lateral directions; and reinforcing ribs 16d protruding from both surfaces of the plate member 16a. The reinforcing ribs 16d and the flanges 16b, 16c serve as storage walls, providing compartments on both surfaces of the plate member 16a defining storage spaces for components of the fuel cell system 100 to be described later.

The rear frame 18 preferably includes a pair of left and right plate members each having a width in the front and rear directions, extending in a rearward and upward direction, and sandwiching a rear end of the front frame 16. Note that FIG. 1 shows the left plate member of the rear frame 18.

A steering shaft 22 is pivotably inserted in the head pipe 14 for steering the vehicle. A handle support 26 is provided at an upper end of the steering shaft 22, to which a handle 24 is fixed. The handle support 26 has an upper end provided with a display/operation board 28.

Figure 3:
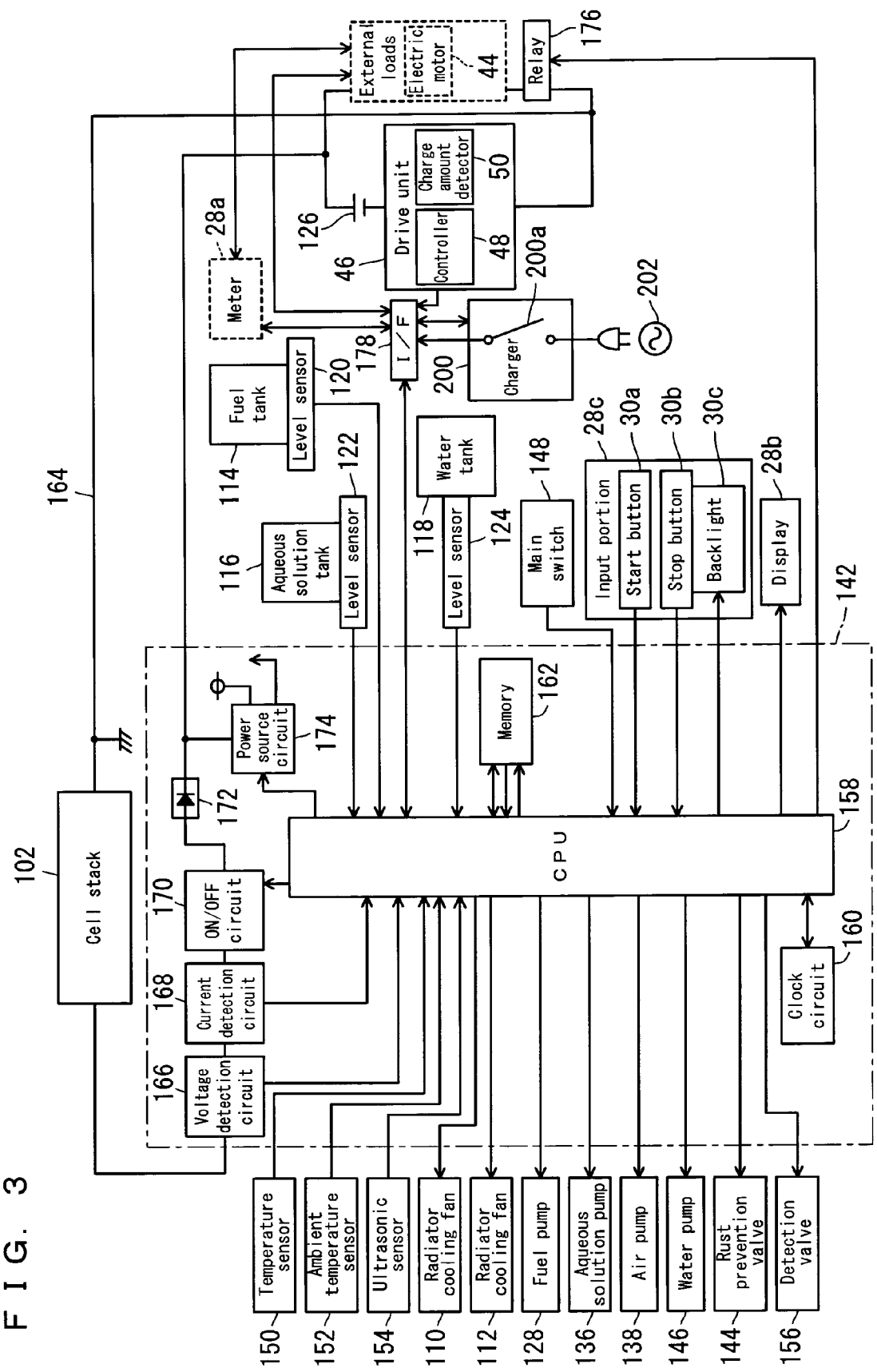
FIG. 3 is a block diagram showing an electrical configuration of the fuel cell system.

Referring also to FIG. 3, the display/operation board 28 is an integrated dashboard preferably including a meter 28a for measuring and displaying various data concerning an electric motor 44 (to be described later) for driving the motorbike 10; a display 28b provided by e.g. a liquid crystal display, for providing the driver with a variety of information concerning the ride; and an input portion 28c for inputting a variety of commands and data. The input portion 28c is preferably provided with a start button 30a for switching a relay 176 thereby connecting a cell stack 102 and a secondary battery 126 with external loads such as an electric motor 44; a stop button 30b for issuing a command to stop power generation in the cell stack 102 after an operation stop command is issued; and a backlight 30c for illuminating the stop button 30b.

As shown in FIG. 1, a pair of left and right front forks 32 extend from a bottom end of the steering shaft 22. Each of the front forks 32 includes a bottom end supporting a front wheel 34 via a front wheel shaft 36. The front wheel 34 is suspended by the front forks 32, and is rotatable around the front wheel shaft 36.

On the other hand, a frame-like seat rail 20 which extends in the front and rear directions is fixed by, e.g. welding, to an upper end of the rear frame 18. An unillustrated seat is provided pivotably on the seat rail 20.

The rear frame 18 includes a lower end which pivotably supports a swing arm (rear arm) 38 via a pivot shaft 40. The swing arm 38 has a rear end 38a incorporating an electric motor 44 of an axial gap type for example, which is connected with the rear wheel 42 to rotate the rear wheel 42. The swing arm 38 also incorporates a drive unit 46 which is electrically connected with the electric motor 44. The drive unit 46 includes a controller 48 for controlling the rotating drive of the electric motor 44, and a charge amount detector 50 arranged to detect the amount of charge in the secondary battery 126 (to be described later). The swing arm 38 and a rear wheel 42 are suspended with an unillustrated rear cushion with respect to the rear frame 18.

The motorbike 10 as described is equipped with a fuel cell system 100, with its constituent members being disposed along the vehicle frame 12. The fuel cell system 100 generates electric energy for driving the electric motor 44 and other system components.

Hereinafter, the fuel cell system 100 will be described with reference to FIG. 1 and FIG. 2.

The fuel cell system 100 is preferably a direct methanol fuel cell system which uses methanol (an aqueous solution of methanol) directly without reformation, for generation of electric energy (power generation).

The fuel cell system 100 includes a fuel cell stack (hereinafter simply called cell stack) 102. As shown in FIG. 1, the cell stack 102 is suspended from the flange 16c, and is disposed below the front frame 16.

Figure 2:
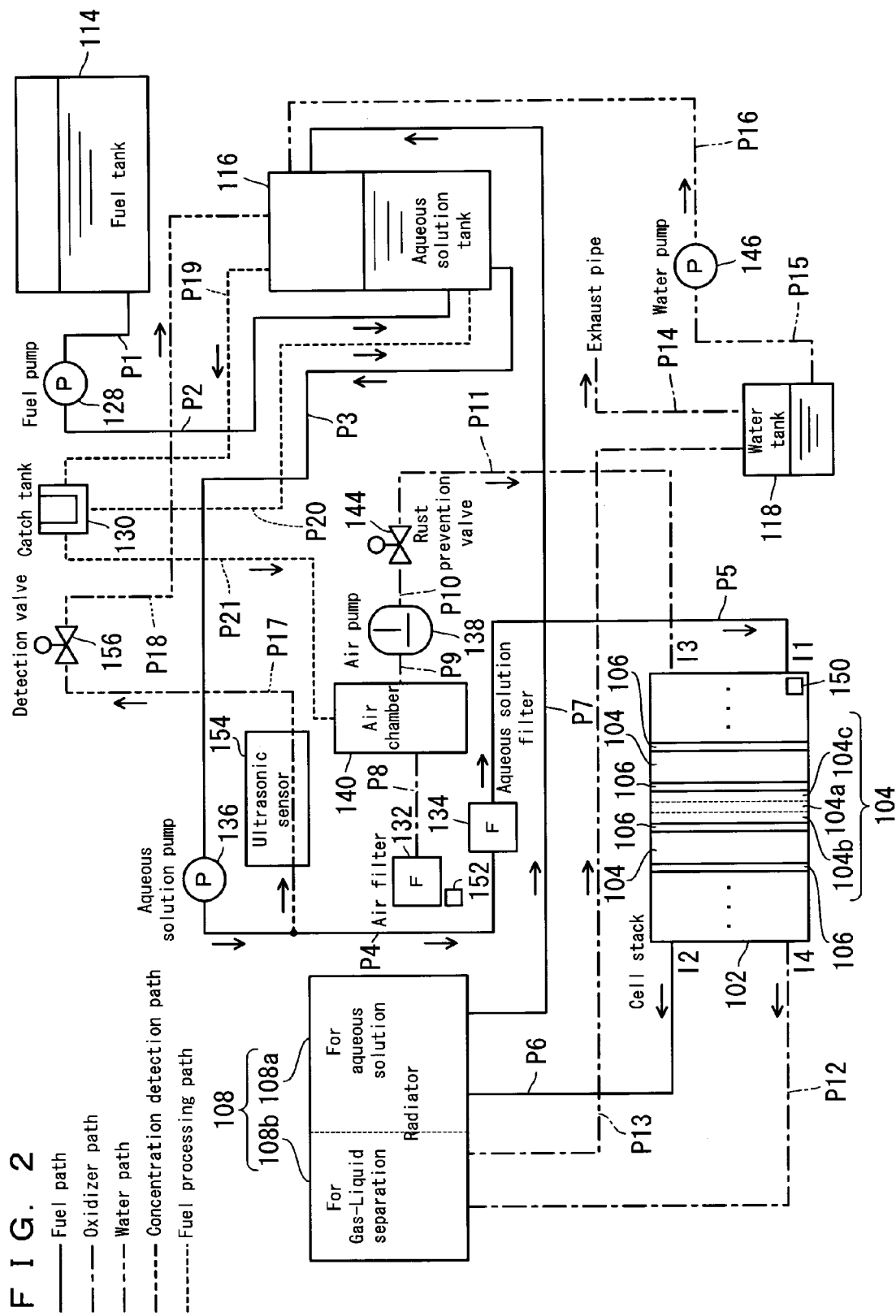
FIG. 2 is a system diagram showing piping in a fuel cell system.

As shown in FIG. 2, the cell stack 102 preferably includes a plurality of fuel cells (individual fuel cells) 104 layered (stacked) in alternation with separators 106. Each fuel cell 104 is capable of generating electric power through electrochemical reactions between hydrogen ion based on methanol and oxygen. Each fuel cell 104 in the cell stack 102 includes an electrolyte film 104a provided by a solid polymer film for example, and a pair of an anode (fuel electrode) 104b and a cathode (air electrode) 104c opposed to each other, with the electrolyte film 104a in between. The anode 104b and the cathode 104c each include a platinum catalyst layer provided on the side closer to the electrolyte film 104a.

As shown in FIG. 1, a radiator unit 108 is disposed below the front frame 16, above the cell stack 102. The radiator unit 108 has a front surface facing in a downward direction so it can receive sufficient winds while the vehicle is in motion.

As shown in FIG. 2, the radiator unit 108 includes integrally provided therein, a radiator 108a for aqueous solution and a radiator 108b for gas-liquid separation. On a back side of the radiator unit 108, there is a fan 110 provided to cool the radiator 108a, and there is another fan 112 (See FIG. 3) provided to cool the radiator 108b. In FIG. 1, the radiators 108a and 108b are disposed side by side, with one on the left-hand side and the other on the right-hand side, and the figure shows the fan 110 for cooling the left-hand side radiator 108a.

A fuel tank 114, an aqueous solution tank 116 and a water tank 118 are disposed in this order from top to down, between the pair of plate members in the rear frame 18.

The fuel tank 114 is below the seat rail 20 and is attached to a rear end of the seat rail 20. The fuel tank 114 contains a methanol fuel (high concentration aqueous solution of methanol) having a high concentration level (containing methanol at approximately 50 wt %, for example) which is used as fuel for the electrochemical reaction in the cell stack 102. The fuel tank 114 is provided with a level sensor 120 for detecting the height of liquid surface of the methanol fuel in the fuel tank 114.

The aqueous solution tank 116 is disposed below the fuel tank 114, and is attached to the rear frame 18. The aqueous solution tank 116 contains aqueous methanol solution, which is a solution of the methanol fuel from the fuel tank 114 diluted to a suitable concentration (containing methanol at approximately 3 wt %, for example) for the electrochemical reaction in the cell stack 102. The aqueous solution tank 116 is provided with a level sensor 122 for detecting the height of liquid surface of the aqueous methanol solution in the aqueous solution tank 116.

The water tank 118, disposed behind the cell stack 102, is mounted on the rear frame 18. A level sensor 124 is attached to the water tank 118 in order to detect a water level in the water tank 118.

In front of the fuel tank 114 and above the flange 16b of the front frame 16 is the secondary battery 126. The secondary battery 126 stores the electric power from the cell stack 102, and supplies the electric power to the electric components in response to commands from a controller 142 (to be described later).

Above the secondary battery 126 and below the seat rail 20, a fuel pump 128 is disposed. Further, a catch tank 130 is disposed in front of the fuel tank 114, i.e. above and behind the secondary battery 126.

An air filter 132 is disposed in a space surrounded by the front frame 16, the cell stack 102 and the radiator unit 108 for removing impurities such as dust contained in gas. Behind and below the air filter 132, an aqueous solution filter 134 is disposed.

An aqueous solution pump 136 and an air pump 138 are housed in the storage space on the left side of the front frame 16. On the left side of the air pump 138 is an air chamber 140.

The controller 142, a rust prevention valve 144 and a water pump 146 are disposed in the storage space on the right side of the front frame 16.

Further, a main switch 148 is provided in the front frame 16, penetrating the storage space in the front frame 16 from right to left. Turning on the main switch 148 provides an operation start command to the controller 142 and turning off the main switch 148 provides an operation stop command to the controller 142.

As shown in FIG. 2, the fuel tank 114 and the fuel pump 128 are connected with each other by a pipe P1. The fuel pump 128 and the aqueous solution tank 116 are connected with each other by a pipe P2. The aqueous solution tank 116 and the aqueous solution pump 136 are connected with each other by a pipe P3. The aqueous solution pump 136 and the aqueous solution filter 134 are connected with each other by a pipe P4. The aqueous solution filter 134 and the cell stack 102 are connected with each other by a pipe P5. The pipe P5 is connected with an anode inlet I1 of the cell stack 102. By driving the aqueous solution pump 136, aqueous methanol solution is supplied to the cell stack 102. A temperature sensor 150 is provided near the anode inlet I1 of the cell stack 102 in order to detect the temperature of aqueous methanol solution. By detecting the temperature of aqueous methanol solution which flows through the cell stack 102 using the temperature sensor 150, the temperature of the cell stack 102 can be detected.

The cell stack 102 and the aqueous solution radiator 108a are connected with each other by a pipe P6, and the radiator 108a and the aqueous solution tank 116 are connected with each other by a pipe P7. The pipe P6 is connected with an anode outlet I2 of the cell stack 102.

The pipes P1 through P7 serve primarily as a flow path for fuel.

The air filter 132 and the air chamber 140 are connected with each other by a pipe P8. The air chamber 140 and the air pump 138 are connected with each other by a pipe P9, the air pump 138 and the rust prevention valve 144 are connected with each other by a pipe P10 whereas the rust prevention valve 144 and the fuel cell stack 102 are connected with each other by a pipe P11. The pipe P11 is connected with a cathode inlet I3 of the cell stack 102. When the fuel cell system 100 generates power, the rust prevention valve 144 is opened. By driving the air pump 138 under this condition, air containing oxygen is introduced from outside. The rust prevention valve 144 is closed when the fuel cell system 100 is stopped, prevents backflow of water vapor into the air pump 138, and thereby prevents rusting of the air pump 138. An ambient temperature sensor 152 is provided near the air filter 132 for detection of an ambient temperature.

The cell stack 102 and the gas-liquid separation radiator 108b are connected with each other by a pipe P12. The radiator 108b and the water tank 118 are connected with each other by a pipe P13. The water tank 118 is provided with a pipe (an exhaust pipe) P14.

The pipes P8 through P14 serve primarily as a flow path for an oxidizer.

The water tank 118 and the water pump 146 are connected with each other by a pipe P15 whereas the water pump 146 and the aqueous solution tank 116 are connected with each other by a pipe P16.

The pipes P15, P16 serve as a flow path for water.

The pipe P4 is connected with the pipe P17 so as to receive a portion of aqueous methanol solution flowing through the pipe P4. An ultrasonic sensor 154 is attached to the pipe P17 for measuring methanol concentration in the aqueous methanol solution (rate of methanol in the aqueous methanol solution). The ultrasonic sensor 154 is used for measuring the methanol concentration, based on the principle that the ultrasonic wave travels at different speeds depending on the methanol concentration. The ultrasonic sensor 154 detects an ultrasonic wave propagation speed in the pipe P17, converts the propagation speed into a voltage value which represents physical concentration information. Based on this concentration information, the controller 142 detects a methanol concentration of the aqueous methanol solution in the pipe P17.

A detection valve 156 is connected with the pipe P17. The detection valve 156 and the aqueous solution tank 116 are connected with each other by a pipe P18. When detecting methanol concentration, the detection valve 156 is closed to stop the flow of aqueous methanol solution in the pipe P17. After the detection of the methanol concentration, the detection valve 156 is opened to release the aqueous methanol solution, whose concentration has been detected, back to the aqueous solution tank 116.

The pipes P17, P18 serve as a flow path primarily for concentration detection.

The aqueous solution tank 116 and the catch tank 130 are connected with each other by pipes P19, P20. The catch tank 130 and the air chamber 140 are connected with each other by a pipe P21.

The pipes P19 through P21 constitute a flow path primarily for fuel processing.

Next, reference will be made to FIG. 3, to describe an electrical configuration of the fuel cell system 100.

The controller 142 of the fuel cell system 100 preferably includes a CPU 158 arranged to perform necessary calculations and controlling operations of the fuel cell system 100; a clock circuit 160 which provides the CPU 158 with clock signals; a memory 162 provided by, e.g., an EEPROM, arranged to store programs and data to control the operations of the fuel cell system 100 as well as calculation data, etc; a voltage detection circuit 166 arranged to detect a voltage in an electric circuit 164 so as to connect the cell stack 102 with external loads; a current detection circuit 168 arranged to detect an electric current which passes through the fuel cells 104, i.e., the cell stack 102; an ON/OFF circuit 170 arranged to open and close the electric circuit 164; a diode 172 placed in the electric circuit 164; and a power source circuit 174 arranged to provide the electric circuit 164 with a predetermined voltage.

The CPU 158 of the controller 142 as described above is supplied with detection signals from the level sensors 120, 122 and 124, as well as detection signals from the temperature sensor 150, the ambient temperature sensor 152 and the ultrasonic sensor 154. The CPU 158 is also supplied with input signals from the main switch 148 for turning ON or OFF the electric power, and input signals from the start button 30a and the stop button 30b in the input portion 28c. Further, the CPU 158 is supplied with detection signals from a charge amount detector 50. The CPU 158 calculates a charge rate of the secondary battery 126 (a ratio of the amount of charge with respect to the capacity of the secondary battery 126), using the detection signal from the charge amount detector 50 and information on the capacity of the secondary battery 126. Further, the CPU 158 is supplied with a voltage detection value from the voltage detection circuit 166 and a current detection value from the current detection circuit 168. The CPU 158 calculates an output of the cell stack 102 from the voltage detection value and the current detection value.

Figure 7:
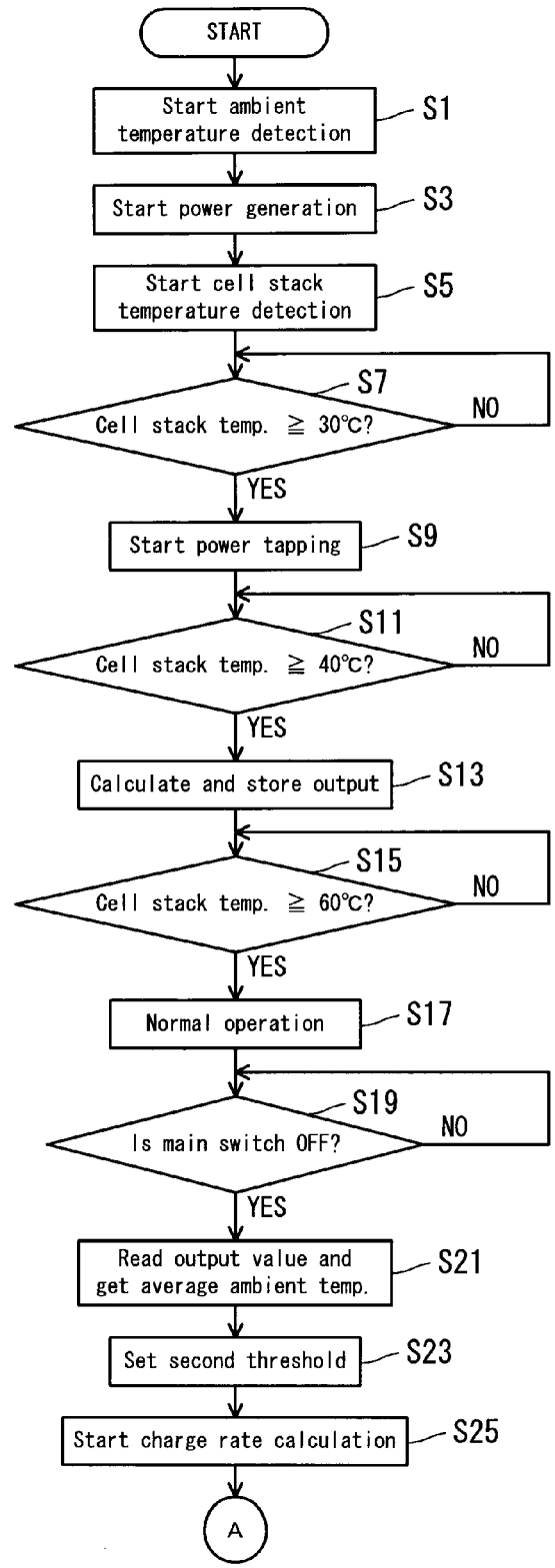
FIG. 7 is a flowchart which shows an example of operation according to a preferred embodiment of the present invention.
Figure 8:
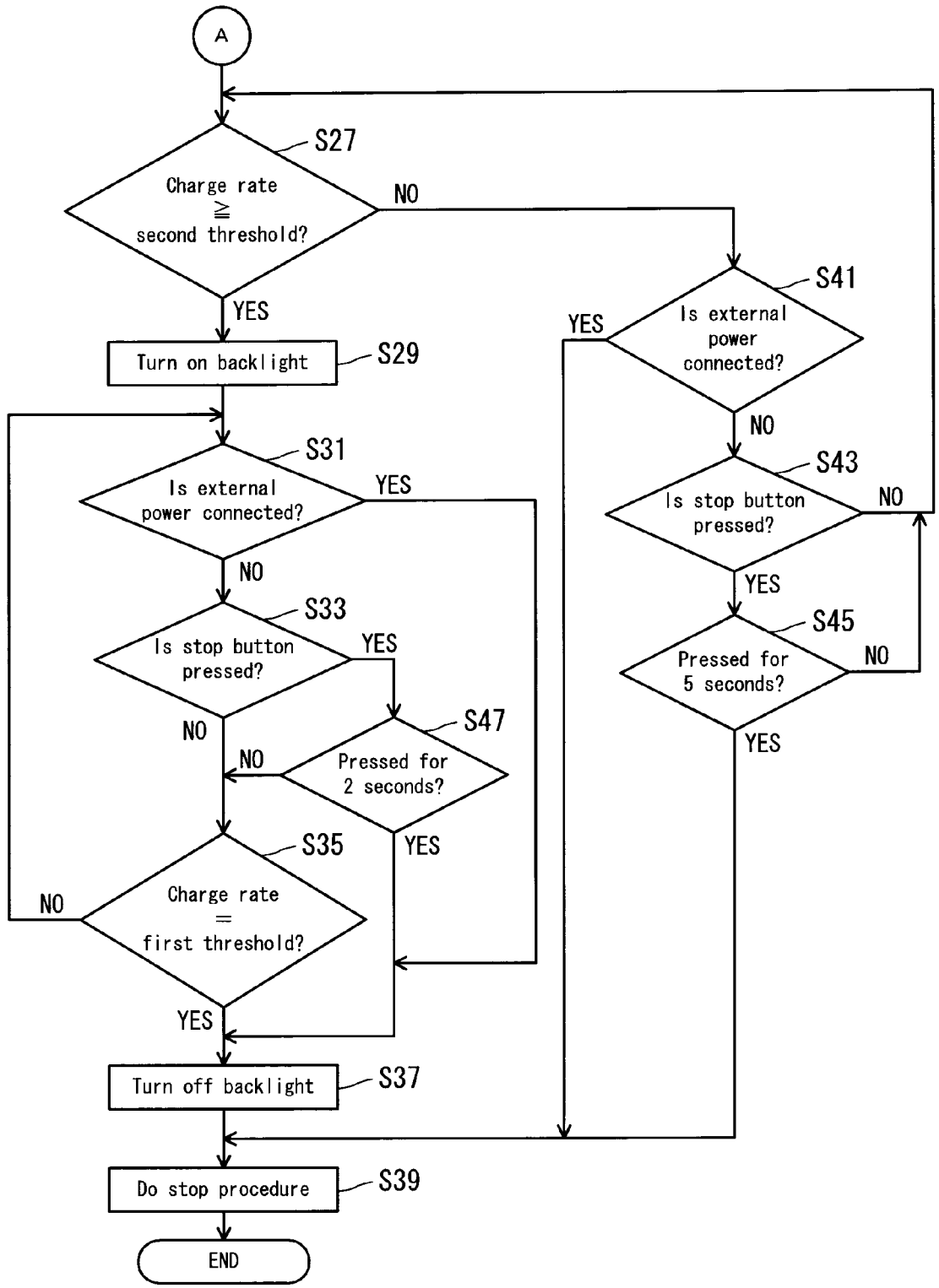
FIG. 8 is a flowchart which shows a continuation portion of the operation from FIG. 7.
Figure 10:
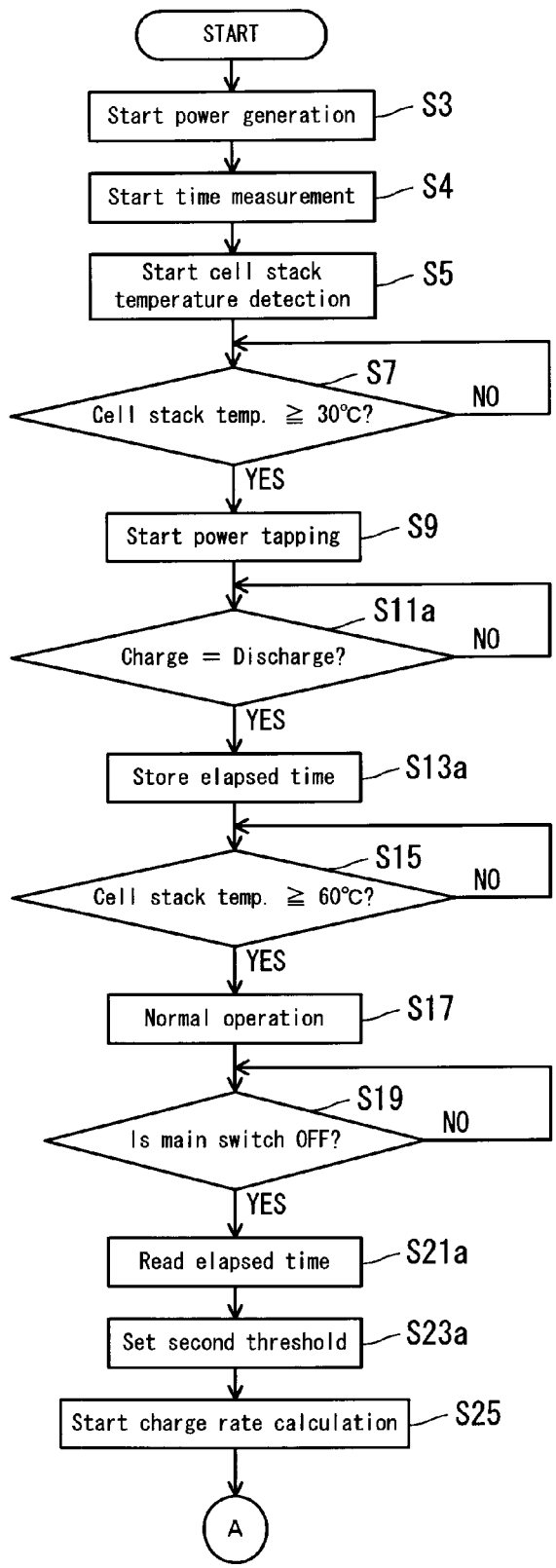
FIG. 10 is a flowchart which shows another example of operation according to a preferred embodiment of the present invention.

The memory 162 preferably stores programs for performing operations depicted in FIG. 7, FIG. 8 and FIG. 10, various table data, a first threshold value which is a norm to be compared to the charge rate of the secondary battery 126, etc, as initial information. In addition, the memory 162 stores various calculation data, flags, ambient temperature values detected by the ambient temperature sensor 152, charge rate values of the secondary battery 126 calculated by the CPU 158, output values of the cell stack 102 calculated by the CPU 158, time values calculated by the CPU 158 based on clock signals from the clock circuit 160, a second threshold value for comparison to the charge rate of the secondary battery 126, etc.

The CPU 158 controls system components such as the fuel pump 128, the aqueous solution pump 136, the air pump 138, the water pump 146, the fans 110, 112, the rust prevention valve 144 and the detection valve 156. The CPU 158 also controls the display 28b which displays various information for the driver of the motorbike 10. Still further, the CPU 158 controls turning ON and OFF of the backlight 30c in the input portion 28c.

The cell stack 102 is connected with the secondary battery 126 and the drive unit 46. The secondary battery 126 and the drive unit 46 are connected with external loads such as the electric motor 44, via the relay 176. The secondary battery 126 complements the output from the cell stack 102, by being charged with electric power from the cell stack 102 and discharging the electricity to supply power to the electric motor 44, the drive unit 46 and the system components, etc.

The electric motor 44 is connected with the meter 28a arranged to measure various data concerning the electric motor 44. The data and status information of the electric motor 44 obtained by the meter 28a are supplied to the CPU 158 via the interface circuit 178.

In addition, a charger 200 is connectable with the interface circuit 178. The charger 200 is connectable with an external power source (commercial power source) 202. When the interface circuit 178 is connected with the external power source 202 via the charger 200, an external power source connection signal is sent to the CPU 158 via the interface circuit 178. The charger 200 has a switch 200a which can be turned ON/OFF by the CPU 158.

In this preferred embodiment, the CPU 158 preferably defines the controller, the determination unit and the threshold setting unit. The memory 162 serves as the memory. The stop button 30b defines an instruction unit while the ambient temperature sensor 152 defines an ambient temperature detector. A charge status detector includes the charge amount detector 50 and the CPU 158, and the amount of charge detected by the charge amount detector 50 is used by the CPU 158 to calculate a charge rate, whereby charge status in the secondary battery 126 is detected. A notification unit includes the stop button 30b and the backlight 30c whereas time measurement unit includes the CPU 158 and the clock circuit 160.

An output information detector includes the CPU 158, the voltage detection circuit 166 and the current detection circuit 168. The output of the cell stack 102 calculated by the CPU 158 is used as information concerning the output from the cell stack 102.

Next, description will cover a main process performed while the fuel cell system 100 is in operation.

When the main switch 148 is turned ON, the fuel cell system 100 starts the controller 142 and commences its operation. Then, when the start button 30a is pressed after the controller 142 is started, the relay 176 is switched to connect external loads such as the electric motor 44 with the cell stack 102 and the secondary battery 126. When the charge rate of the secondary battery 126 becomes not higher than the second threshold value, electricity from the secondary battery 126 is used to drive the system components such as the aqueous solution pump 136 and the air pump 138, and thus power generation is started in the cell stack 102.

It should be noted here that the external loads refer to loads which consume electricity other than the electricity required for maintaining the power generation in the cell stack 102. Specifically, the external loads in the present preferred embodiment include the electric motor 44, the headlight of the motorbike 10, and so on.

Referring now to FIG. 2, an aqueous methanol solution in the aqueous solution tank 116 is sent via the pipes P3, P4 to the aqueous solution filter 134 as the aqueous solution pump 136 is driven. The aqueous solution filter 134 removes impurities and so on from the aqueous methanol solution, then the aqueous methanol solution is sent through the pipe P5 and the anode inlet I1, directly to the anode 104b in each of the fuel cells 104 which constitute the cell stack 102.

Meanwhile, gas (primarily containing carbon dioxide, vaporized methanol and water vapor) in the aqueous solution tank 116 is supplied via the pipe P19 to the catch tank 130. The methanol vapor and water vapor are cooled in the catch tank 130, and the aqueous methanol solution obtained in the catch tank 130 is returned via the pipe P20 to the aqueous solution tank 116. On the other hand, gas (containing carbon dioxide, non-liquefied methanol and water vapor) in the catch tank 130 is supplied via the pipe P21 to the air chamber 140.

On the other hand, as the air pump 138 is driven, air is introduced through the air filter 132 and flows through the pipe P8 into the air chamber 140 where noise is silenced. The air which was introduced to the air chamber 140 and gas from the catch tank 130 flow via the pipe P9 to the air pump 138, and then through the pipe P10, the rust prevention valve 144, the pipe P11 and the cathode inlet I3, into the cathode 104c in each of the fuel cells 104 which constitute the cell stack 102.

At the anode 104b in each fuel cell 104, methanol and water in the supplied aqueous methanol solution chemically react with each other to produce carbon dioxide and hydrogen ions. The produced hydrogen ions flow to the cathode 104c via the electrolyte film 104a, and electrochemically react with oxygen in the air supplied to the cathode 104c, to produce water (water vapor) and electric energy. Thus, power generation is performed in the cell stack 102. The electricity from the cell stack 102 is used to charge the secondary battery 126, to drive the motorbike 10 and so on. The temperature of the cell stack 102 is increased by the heat associated with the electrochemical reactions. The output of the cell stack 102 increases as the temperature rises, and the cell stack 102 becomes able to perform normal constant power generation at approximately 60° C. In other words, the fuel cell system 100 transfers to the normal operation when the temperature of the cell stack 102 is at approximately 60° C.

The temperatures of carbon dioxide produced at the anode 104b in each fuel cell 104 and of unused aqueous methanol solution are increased (up to approximately 65° C.-70° C., for example) by the heat associated with the electrochemical reaction, and part of the unused aqueous methanol solution is vaporized. The carbon dioxide and the unused aqueous methanol solution flow from the anode outlet I2 of the cell stack 102, through the pipe P6 into the aqueous solution radiator 108a, where they are cooled (down to approximately 40° C. for example) by the radiator 108a. The cooling of the carbon dioxide and the unused methanol by the radiator 108a is performed by driving the fan 110. The carbon dioxide and the unused aqueous methanol solution which have been cooled then flow through the pipe P7, and return to the aqueous solution tank 116.

Meanwhile, most of the water vapor occurring on the cathode 104c in each fuel cell 104 is liquefied and discharged in the form of water from the cathode outlet I4 of the cell stack 102, with saturated water vapor being discharged in the form of gas. Part of the water vapor which was discharged from the cathode outlet I4 is supplied via the pipe P12 to the radiator 108b, where it is cooled and liquefied as its temperature decreases to or below the dew point. The radiator 108b liquefies the water vapor through operation of the fan 112. Discharge from the cathode outlet I4, which contains water (liquid water and water vapor), carbon dioxide and unused air, is supplied via the pipe P12, the radiator 108b and the pipe P13, to the water tank 118 where water is collected, and thereafter, discharged to outside via the pipe P14.

At the cathode 104c in each fuel cell 104, the vaporized methanol from the catch tank 130 and methanol which has moved to the cathode due to crossover react with oxygen in the platinum catalyst layer, thereby being decomposed to harmless substances of water and carbon dioxide. The water and carbon dioxide which occurred from the methanol are discharged from the cathode outlet I4, and supplied to the water tank 118 via the radiator 108b. Further, water which has moved due to water crossover to the cathode 104c in each fuel cell 104 is discharged from the cathode outlet I4, and supplied to the water tank 118 via the radiator 108b. The water collected in the water tank 118 is recycled appropriately by pumping operation of the water pump 146, through the pipes P15, P16 to the aqueous solution tank 116, and is used as water for the aqueous methanol solution.

While the fuel cell system 100 is generating electric power, a concentration detection routine for aqueous methanol solution is performed regularly for efficient power generation by each fuel cell 104 and prevention of premature deterioration of the fuel cell 104. Based on the detection result, the methanol concentration of aqueous methanol solution which is to be supplied to the cell stack 102 is adjusted to approximately 3 wt. %, for example, in the aqueous solution tank 116. Specifically, the fuel pump 128 is driven whereby methanol fuel is supplied from the fuel tank 114 to the aqueous solution tank 116 via the pipes P1, P2 based on the detection result of the methanol concentration. Likewise, the water pump 146 is driven whereby water is returned from the water tank 118 to the aqueous solution tank 116 based on the detection result of the methanol concentration.

According to the fuel cell system 100 as described above, electric power is not tapped from the cell stack 102 until the cell stack 102 reaches a predetermined power tapping temperature (about 30° C. in this preferred embodiment), because it is impossible to take sufficient electric power from the cell stack 102 when the temperature is below the power tapping temperature.

Once power tapping starts, the cell stack 102 charges an amount of electricity to the secondary battery 126. However, the charge rate of the secondary battery 126 decreases, normally for a while, since the amount of charge is smaller than the amount of discharge from the secondary battery 126 for operating the fuel cell system 100.

Figure 4:
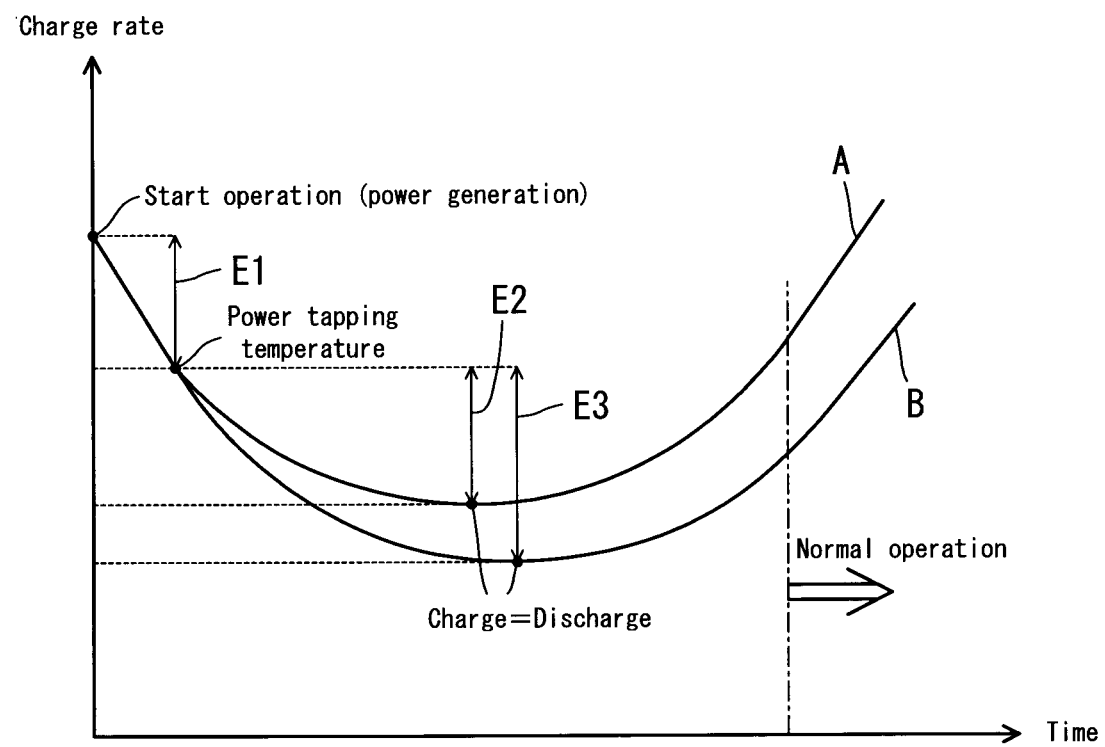
FIG. 4 is a graph showing time course changes of a charge rate in a secondary battery after starting an operation.

Now, reference will be made to FIG. 4 to describe time course changes in the charge rate of the secondary battery 126. It should be noted here that in FIG. 4, power generation is started simultaneously as the system starts its operation, in order to obtain a first necessary charge rate (to be described later). In FIG. 4, Curve A shows a time course changes in the charge rate when the temperature of the cell stack 102 is about 40° C. and the output from the cell stack 102 is about 300 W whereas Curve B shows time course changes in the charge rate when the temperature of the cell stack 102 is about 40° C. and the output from the cell stack 102 is about 200 W.

A time period from operation (power generation) start to when the cell stack 102 reaches the power tapping temperature is a period when the fuel cell system 100 is driven only by the power supplied from the secondary battery 126. This time is short if the ambient temperature is high while it is long if the ambient temperature is low. Therefore, the charge rate of the secondary battery 126 decreases by a small amount if the ambient temperature is high while the decrease is large if the ambient temperature is low. As understood, the amount of decrease in the charge rate during this period until tapping of electricity from the cell stack 102 begins is determined by the ambient temperature, and for this reason, the amount of decrease in the charge rate is E1 in both of the Curves A and B. In other words, the charge rate necessary for the secondary battery 126 (hereinafter called the first necessary charge rate) from the time when the operation is started to the time when tapping of electricity is started is E1 for whichever of A and B.

Figure 5:
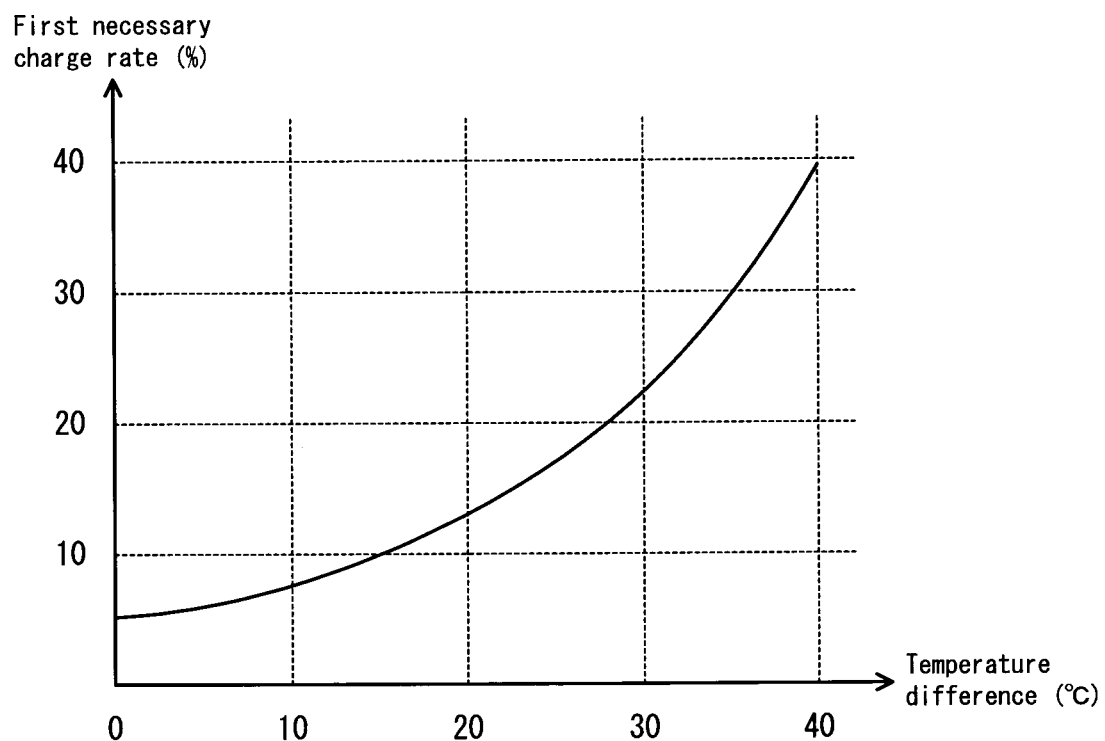
FIG. 5 is a graph showing a charge rate required of the secondary battery for a difference between a power tapping temperature and an ambient temperature.

In order to obtain the first necessary charge rate appropriate to the ambient temperature, first table data is stored in the memory 162 which relates a given value (a temperature difference) obtained by subtracting the ambient temperature from the power tapping temperature to the first necessary charge rate. FIG. 5 shows the first table data in the form of a graph. It is understood from FIG. 5 that a greater temperature difference will give a greater first necessary charge rate. If the temperature difference (power tapping temperature minus ambient temperature) is smaller than zero, the temperature difference is assumed to be zero. When the temperature difference is zero, there is still some first necessary charge rate greater than zero because certain amount of energy is necessary for starting the controller 142, etc.

Also, as shown in FIG. 4, the amount of decrease in the charge rate of the secondary battery 126 from the time when power tapping is started to the time when an equilibrium is reached between charging and discharging in the secondary battery 126 is small if the output from the cell stack 102 is large while the decrease is large if the output from the cell stack 102 is small. This is because a larger output from the cell stack 102 allows the system to cover more quickly the amount of power necessary for driving the fuel cell system 100 by the output from the cell stack 102 alone and therefore bring more quickly the secondary battery 126 to an equilibrium between charging and discharging. A charge rate decrease E2 in Curve A which has a greater output than Curve B is smaller than a charge rate decrease E3 in Curve B. Specifically, in Curve A, a charge rate (hereinafter called the second necessary charge rate) which is necessary from the time when power tapping is started to the time when the secondary battery 126 comes to a charge-discharge equilibrium is E2 whereas the second necessary charge rate is E3 in Curve B.

Figure 6:
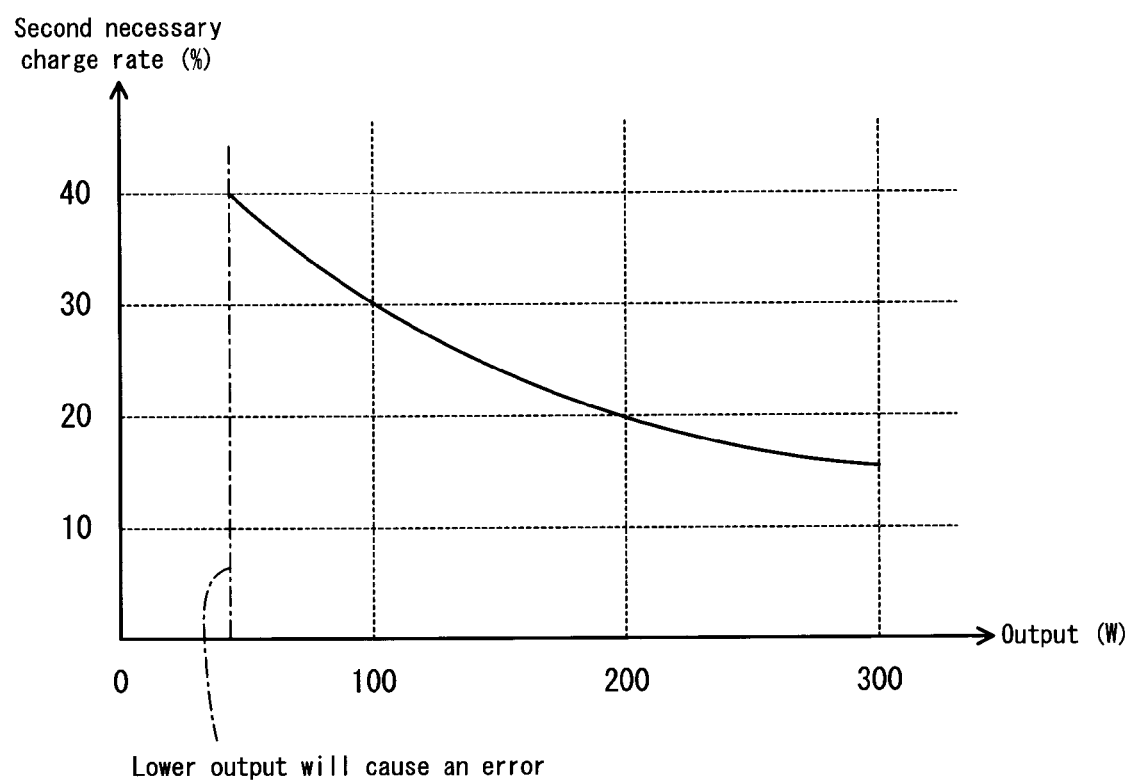
FIG. 6 is a graph showing a charge rate required of the secondary battery for an output from a cell stack.

In order to obtain the second necessary charge rate appropriate to the output from the cell stack 102, a second table data is stored in the memory 162 which relates a given output value from the cell stack 102 at a predetermined output detection temperature (about 40° C. in this preferred embodiment) to the second necessary charge rate. FIG. 6 shows the second table data in the form of a graph. It is understood from FIG. 6 that a greater output from the cell stack 102 will give a smaller second necessary charge rate.

If the charge rate of the secondary battery 126 is smaller than a sum of the first necessary charge rate and the second necessary charge rate when the system is started next time, the charge rate of the secondary battery 126 will become 0% before the output from the cell stack 102 can cover the power consumption, which will unable the cell stack 102 to continue power generation before the system transfers to normal operation, and cause the fuel cell system 100 to stop. In order to avoid this, the fuel cell system 100 continues power generation in the cell stack 102 to give the secondary battery 126 a preliminary charge after the main switch 148 is turned OFF, i.e. after an operation stop command is issued, if the charge rate of the secondary battery 126 is lower than a predetermined first threshold value (100% in this preferred embodiment).

Now, reference will be made to FIG. 7 and FIG. 8 to describe a charge control operation in the fuel cell system 100.

First, the main switch 148 is turned ON, which gives an operation start command to the controller 142 whereby the controller 142 is started. After the controller 142 is started, the ambient temperature sensor 152 starts regular detection of the ambient temperature under the direction from the CPU 158 (Step S1). The ambient temperatures detected regularly by the ambient temperature sensor 152 are stored in the memory 162.

When the charge rate of the secondary battery 126 becomes not higher than the second threshold value which was set in the previous operation, the controller 142 issues a power generation start command, whereby system components such as the aqueous solution pump 136 and the air pump 138 are driven by the electricity from the secondary battery 126 to start power generation in the cell stack 102 (Step S3). Along with this, the temperature sensor 150 begins a temperature detection routine of the cell stack 102 (Step S5). The CPU 158 monitors the temperature of the cell stack 102, and checks if the cell stack 102 has reached the power tapping temperature (about 30° C.) (Step S7). If the cell stack 102 has reached the power tapping temperature, power tapping from the cell stack 102 is started (Step S9), and the power from the cell stack 102 is charged to the secondary battery 126. This reduces the pace of decrease in the charge rate of the secondary battery 126 (See FIG. 4).

Subsequently, the CPU 158 checks if the temperature of the cell stack 102 has reached an output detection temperature (about 40° C.) (Step S11). If the temperature of the cell stack 102 has reached the output detection temperature, the output of the cell stack 102 is calculated from a voltage detection value given by the voltage detection circuit 166 and electric current detection value given by the current detection circuit 168 at this time point, and the calculated output is stored in the memory 162 (Step S13).

Then, the CPU 158 checks if the temperature of the cell stack 102 has reached about 60° C. (Step S15). If the temperature of the cell stack 102 has reached about 60° C., the system is able to shift to normal power generation, and so the system transfers to normal operation (Step S17). Thereafter, when the main switch 148 is turned OFF in Step S19, an operation stop command is given to the controller 142, whereby power tapping from the cell stack 102 and the secondary battery 126 by the external loads such as the electric motor 44 is stopped. Along with this, the system reads a plurality of values about the ambient temperature and the output from the cell stack 102 so far detected, from the memory 162. The CPU 158 then calculates an average of the ambient temperature values (average ambient temperature) (Step S21), and then sets the second threshold value by using the calculated average ambient temperature and the output of the cell stack 102 (Step S23).

In Step S23, the system reads the first table data, i.e. data corresponding to the graph in FIG. 5, from the memory 162. From the first table data, the system obtains the first necessary charge rate which corresponds to a difference (a temperature difference) between the power tapping temperature and the average ambient temperature during this cycle of operation. The system also reads the second table data, i.e. data corresponding to the graph in FIG. 6, from the memory 162, and from the second table data, the system obtains the second necessary charge rate which corresponds to the output of the cell stack 102 in this cycle of operation. Then, the system sets a current second threshold value to a sum of the first necessary charge rate and the second necessary charge rate.

In this preferred embodiment, the temperature difference for obtaining the first necessary charge rate from the first table data, and the output of the cell stack 102 for obtaining the second necessary charge rate from the second table data represent the information concerning the amount of charge necessary for the secondary battery 126 from system start up to charge-discharge equilibrium in the secondary battery 126.

Subsequently, the charge amount detector 50 begins a routine of detecting the amount of charge, and the CPU 158 monitors the charge rate of the secondary battery 126 (Step S25). The CPU 158 checks if the charge rate of the secondary battery 126 is not lower than the second threshold value (Step S27). If the charge rate is not lower than the second threshold value, the CPU 158 turns ON the backlight 30c, i.e. the stop button 30b (Step S29). By turning the stop button 30b ON, the motorbike driver can recognize that a power generation stop command from the stop button 30b is now valid, and that the system is ready to accept the command. In other words, it is possible to let the motorbike driver recognize that the charging the secondary battery 126 can now be stopped.

Subsequently, if Step S31 finds no external power source 202 connected with the interface circuit 178 via the charger 200, and if Step S33 does not find that the stop button 30b is pressed, then the system continues power generation in the cell stack 102 to charge the secondary battery 126. The CPU 158 checks if the charge rate of the secondary battery 126 has reached the first threshold value (100%) (Step S35). If the charge rate is 100%, the backlight 30c is turned OFF (Step S37), and a stopping process is performed (Step S39).

Step S39 includes stoppage of the system components, turning OFF of the ON/OFF circuit 170, deletion of average ambient temperature values in the memory 162, etc. Thereafter, the controller 142 is stopped and the operation of the fuel cell system 100 is stopped. If Step S35 determines that the charge rate is not 100%, the process goes back to Step S31.

On the other hand, if Step S27 finds that the charge rate is lower than the second threshold value, the process goes to Step S41. If Step S41 finds that there is no external power source 202 connected with the interface circuit 178 via the charger 200, the process goes to Step S43. If Step S43 finds that the stop button 30b is not pressed, then the process goes back to Step S27.

If Step S41 finds that an external power source 202 is connected with the interface circuit 178 via the charger 200, the process goes to Step S39, to perform the stopping process and charge the secondary battery 126 with the power from the external power source 202 via the charger 200.

When Step S43 determines that the stop button 30b is pressed, then the system checks if the stop button 30b was pressed continuously for a period of five seconds (Step S45). If the button was not pressed for a continuous period of five seconds, the power generation stopping command is deemed to be invalid, and the process goes back to Step S27, where charging of the secondary battery 126 is continued. If Step S45 finds that the stop button 30b was pressed continuously for a period of five seconds, the power generation stopping command is accepted and the process goes to Step S39.

If Step S33 finds that the stop button 30b is pressed, then the system checks if the stop button 30b was pressed continuously for a period of two seconds (Step S47). If the stop button 30b was pressed continuously for a period of two seconds, a power generation stopping command is accepted and the process proceeds to Step S37. If Step S47 finds that the stop button 30b was not pressed for a continuous period of two seconds, the power generation stopping command is deemed to be invalid, and the process goes to Step S35.

If Step S31 determines that an external power source 202 is connected with the interface circuit 178 via the charger 200, the process goes to Step S37.

According to the fuel cell system 100 as described, a comparison is made between the charge rate of the secondary battery 126 and the second threshold value which is an estimated necessity in the secondary battery 126 from next system start up to a charge-discharge equilibrium reached in the secondary battery 126.

Then, if the charge rate of the secondary battery 126 is not lower than the second threshold value and is lower than the first threshold value, it is then possible to stop power generation in the cell stack 102 by pressing the stop button 30b for two seconds thereby making the power generation stopping command valid. Since it is possible to abort charging which takes place after the main switch 148 is turned OFF, the system does not decrease operator convenience.

Further, as long as the charge rate of the secondary battery 126 is lower than the second threshold value, a power generation stopping command from the stop button 30b is invalidated and power generation by the cell stack 102 is continued until the stop button 30b is pressed for five seconds. This allows the secondary battery 126 to be charged until the charge rate becomes not smaller than the second threshold value, enabling a more reliable transfer to normal operation in the next cycle of operation. Specifically, if the charge rate of the secondary battery 126 is lower than the second threshold value, power generation in the cell stack 102 is stopped by a different (special) power generation stopping command (by pressing the button for five seconds: See Step S45) instead of a normal (standard) power generation stopping command (by pressing the button for two seconds: See Step S47) which is used when the charge rate is not lower than the second threshold value and is lower than the first threshold value. This enables to eliminate unintended termination of power generation, thereby ensuring that the secondary battery 126 can be charged until the charge rate becomes not lower than the second threshold value. It should be noted here that the above-described special power generation stopping command is not limited to pressing the button for a long time, but may be whatsoever different from the above-described normal power generation stopping command.

By obtaining the first necessary charge rate which corresponds to an average ambient temperature, and the second necessary charge rate which indicates the output of the cell stack 102, every time the system is operated, and using a sum of these as the second threshold value, it becomes highly probable to clear an actual charge rate which is really necessary for the secondary battery 126 in the next system operation, and to validate a power generation stopping command from the stop button 30b at an appropriate timing in the current operation.

Using a sum of the first necessary charge rate obtained from an average ambient temperature and the second necessary charge rate obtained from an output of the cell stack 102 as the second threshold value provides an advantage that an appropriate second threshold value suited to the external environment and the output characteristic of the cell stack 102 can be set if a difference in the ambient temperature between the current operation and the next operation is small. Setting the output detection temperature to a temperature (about 40° C. in this preferred embodiment) passed before the normal operation starts provides an advantage that the second threshold value is appropriately related to the output characteristic before the normal operation, making it possible to set a more accurate second threshold value than using an output value detected during the normal operation.

It is now possible to let the operator know if he can stop power generation in the cell stack 102 with a power generation stopping command from the stop button 30b, by means of turning ON/OFF the backlight 30c, i.e., the stop button 30b. This reduces the waiting time of the operator.

By connecting an external power source 202 with the interface circuit 178 via the charger 200, even when charging is underway after the main switch 148 is turned OFF, power generation in the cell stack 102 is stopped and the secondary battery 126 is charged by the external power source 202. Prioritizing the charging by an external power source 202 as described above enables reduction in the amount of aqueous methanol solution which must be replenished to the cell stack 102, thereby saving methanol fuel.

The motorbike 10 is not always stopped at a place where an external power supply is available. Since preferred embodiments of the present invention assure a successful transfer to the normal operation when the system is started next time without sacrificing operator convenience, preferred embodiments of the present invention can be utilized suitably to transportation equipment such as the motorbike 10.

It should be noted here that in the above-described charge control operation, the output detection temperature in Step S11 is preferably about 40° C.; however, the output detection temperature may be about 60° C. or higher. In other words, output detection of the cell stack 102 may be made after entering the normal operation.

Also, in the charge control operation described above, an output of the cell stack 102 is preferably used as the information concerning the output from the cell stack 102. However, the information concerning the output from the cell stack 102 may be provided by an electric current value or a voltage value of the cell stack 102.

Further, Steps S43 and S45 may be removed and if an external power source 202 is not connected in Step S41, the process may go back to Step S27. In other words, there may be an arrangement that the power generation stopping command is invalidated even if the stop button 30b is continuously pressed. This guarantees that the charging of the secondary battery 126 by the cell stack 102 continues unless an external power source 202 is found to be connected in Step S41, and that the charge rate will be brought to or beyond the second threshold value.

Further, Step S47 may not necessarily check if the stop button 30b was pressed for two seconds, but check the intention of the operator by displaying a message for example, on the display portion 28b. In this case, the system turns OFF the backlight 30c and begins the stopping process if, for example, the stop button 30b is pressed again after the message is displayed.

Further, Step S47 may be removed. In other words, there may be an arrangement that the backlight 30c is turned OFF and the stopping process is started immediately once Step S33 finds that the stop button 30b is pressed.

It should be noted that if the main switch 148 is turned OFF before the system transfers to normal operation, the process moves to Step S21. For example, if the main switch 148 is turned OFF before Step S13 is executed, the system will set the second threshold value based on the output in the previous operation. Likewise, if the fuel cell system 100 is connected with an external power source 202 before normal operation, the process may move to Step S39.

Power generation by the cell stack 102 may be continued even after an external power source 202 is connected with the interface circuit 178, until the charge rate of the secondary battery 126 reaches the second threshold value. By stopping the power generation in cell stack 102 thereafter, startability in the next cycle of operation is ensured, even in a case where the charging by the external power is unsuccessful due to power failure for example.

Next, description will cover another example of charge control operation in the fuel cell system 100.

Although the charge control operation described above preferably uses an ambient temperature and an output of the cell stack 102 in setting the second threshold value, the present invention is not limited to this. For example, charge control may be based on the fact that the longer is a time elapsed from start of power generation to when a charge-discharge equilibrium is achieved in the secondary battery 126 (hereinafter simply called the elapsed time), the more amount of electricity is used by the fuel cell system 100 before the charge-discharge equilibrium is achieved in the secondary battery 126. Based on this, the elapsed time may be used as a basis for setting the second threshold value.

If the elapsed time is used for setting the second threshold value, a third table data is prepared which relates the elapsed time to the necessary charge rate (a charge rate required of the secondary battery 126 from the system start up to the time when the secondary battery 126 reaches a charge-discharge equilibrium). From this table data, a necessary charge rate that corresponds to the elapsed time in the current operation is obtained. In this example, the elapsed time used for obtaining the necessary charge rate from the third table data represents the information concerning the amount of charge required of the secondary battery 126 from the system start up to the time when the secondary battery 126 reaches a charge-discharge equilibrium.

The third table data which relates the elapsed time to the necessary charge rate is stored in the memory 162 as initial information. FIG. 9 shows a graphic representation of the third table data. It will be understood from FIG. 9 that the longer is the elapsed time, the greater is the necessary charge rate, which means that a longer elapsed time will require a greater second threshold value.

There can be a case where the system is started and power generation is started, after the system was stopped, before the cell stack 102 has cooled down to the ambient temperature. Specifically, there can be a case where the system is re-started and power generation is re-started when the temperature of the cell stack 102 is approximately 45° C. In this case, the secondary battery 126 will come to a charge-discharge equilibrium almost as soon as the power generation is started. Even in this case, secondary battery 126 will need a charge rate of approximately 7% in order to start the controller 142 and to drive the system components. In other word, a charge rate of approximately 7% is necessary as shown in FIG. 9 even when the elapsed time is zero.

Next, the description will cover a charge control operation in which the second threshold value is set by using the elapsed time, with reference to FIG. 10. In FIG. 10, steps which are preferably the same as those in FIG. 7 are indicated with the same alphanumeric symbols as in FIG. 7, and repetitive description will be omitted or minimized.

First, the main switch 148 is turned ON, whereupon the controller 142 is started, and then power generation is started as the charge rate of the secondary battery 126 becomes not higher than the second threshold value (Step S3). Then, the CPU 158 starts measurement of the time elapsed since power generation is started, based on clock signals from the clock circuit 160 (Step S4).

After Step S9, the CPU 158 checks if the secondary battery 126 is in a charge-discharge equilibrium (Step S11a). If it is, measurement of the elapsed time is stopped and the time elapsed from the start of power generation to when the charge-discharge equilibrium is reached is stored in the memory 162 (Step S13a).

Thereafter, when the main switch 148 is turned OFF in Step S19, then the CPU 158 reads the elapsed time from the memory 162 (Step S21a). Along with this, the system reads the third table data, i.e., data corresponding to the graph in FIG. 9, from the memory 162, and uses a necessary charge rate that matches the current elapsed time, as the second threshold value (Step S23a). Thereafter, the process goes to Step S25 and then to Step S27 in FIG. 8.

As described, an appropriate second threshold value can be set easily by simply obtaining the necessary charge rate from the third table data, using the elapsed time.

It should be noted here that if there is an amount of power consumption after the operation is stopped and before the system is started next time, the second threshold value is set to an appropriately large value in consideration of the amount. Note also that the first threshold value may be lower than 100%. In this case, Step S35 in FIG. 8 will check if the charge rate is not lower than the first threshold value.

In each of the above-described preferred embodiments, the power tapping temperature is preferably set to about 30° C. However, the power tapping temperature may be lower than about 30° C. if a sufficient amount of electricity can be tapped from the cell stack 102.

Further, in each of the above-described preferred embodiments, the backlight 30c is turned ON or OFF whereby the stop button 30b is lit or unlit in order to let the operator know if power generation in the cell stack 102 can be stopped or not. However, the notification unit is not limited to this. For example, two backlights each having a different luminescent color from each other may be provided, so that one of the backlights is used to turn on the stop button 30b when a power generation stopping command is valid while the other of the backlights is used to turn on the stop button 30b when the power generation stopping command is invalid. As another example, the notification unit may be provided by a speaker to let the operator know audibly if the power generation by the cell stack 102 may be stopped or not.

Further, the memory 162 may store a fourth table data which relates the output of the cell stack 102 to the necessary charge rate. The necessary charge rate is selected from the fourth table data as a value corresponding to the output of the cell stack 102 during the current operation, and this value is used as the second threshold value. In other words, the necessary charge rate may be obtained from the fourth table data by using the output of the cell stack 102 alone, in order to set the second threshold value. As still another variation, the memory 162 may store a fifth table data which relates the ambient temperature to the necessary charge rate. The necessary charge rate is obtained from the fifth table data as a value corresponding to the ambient temperature during the current operation, and this value is used as the second threshold value. In other words, the necessary charge rate may be obtained from the fifth table data by using the ambient temperature alone, in order to set the second threshold value.

In each of the preferred embodiments described above, charge control operation is performed by using the charge rate of the secondary battery 126 as an indicator of charge status. However, the present invention is not limited to this. For example, charge status may be indicated by the amount of charge in the secondary battery 126, the voltage in the secondary battery 126, temperature-rise gradient of the secondary battery 126, the electric current value from the cell stack 102, the voltage value of the cell stack 102, etc.

Further, in each of the preferred embodiments described above, the instruction unit is preferably a stop button 30b. However, the present invention is not limited to this. For example, the display portion 28b may include a touch-sensitive panel and the display portion 28b may display icons serving as the instruction unit.

It should be noted here that the fuel cell system according to various preferred embodiments of the present invention can be used suitably not only in motorbikes but also in any other transportation equipment such as automobiles, marine vessels, etc.

Further, preferred embodiments of the present invention are applicable to a hydrogen fuel cell system in which hydrogen gas is supplied as a fuel to the fuel cell. Preferred embodiments of the present invention are also applicable to fuel cell systems which make use of a reformer. Further, preferred embodiments of the present invention are applicable to stationary-type fuel cell systems.

The present invention being thus far described and illustrated in detail, it is obvious that these description and drawings only represent examples of various preferred embodiments of the present invention, and should not be interpreted as limiting the present invention. The spirit and scope of the present invention is only limited by words used in the accompanied claims.

What is claimed is:

1. A fuel cell system comprising:
   a fuel cell;
   a secondary battery charged by the fuel cell;
   a charge status detector arranged to detect a charge status of the secondary battery;
   a controller programmed to control power generation in the fuel cell;
   a main switch arranged to start and stop operation of the fuel cell system; and
   an instruction unit arranged to stop power generation in the fuel cell; wherein
   the controller is programmed such that after the controller receives an operation stop command from the main switch during power generation in the fuel cell:
   the controller is programmed to continue power generation in the fuel cell until a result of detection by the charge status detector is not lower than a first threshold value, before stopping power generation in the fuel cell;
   the controller is programmed to stop power generation in the fuel cell in response to a first power generation stopping command from the instruction unit if a result of detection by the charge status detector is lower than the first threshold value and not lower than a second threshold value;
   the controller is programmed to continue power generation in the fuel cell if a result of detection by the charge status detector is lower than the second threshold value such that the secondary battery is charged until the charge status is a value not lower than the second threshold value even when the instruction unit provides the first power generation stopping command; and
   the controller is programmed to stop power generation in the fuel cell in response to a second power generation stopping command from the instruction unit if a result of detection by the charge status detector is lower than the second threshold value.

2. The fuel cell system according to claim 1, further comprising a determination unit arranged to determine if the fuel cell system is connected with an external power source for charging the secondary battery, wherein the controller is programmed to stop power generation in the fuel cell if the determination unit determines that the external power source is connected with the fuel cell system.

3. The fuel cell system according to claim 2, wherein the controller is programmed to stop power generation in the fuel cell if the determination unit determines that the external power source is connected with the fuel cell system and a result of detection by the charge status detector is lower than the first threshold value and not lower than the second threshold value.

4. The fuel cell system according to claim 1, further comprising a setting unit arranged to set the second threshold value based on information concerning an amount of charge necessary for the secondary battery from a time when the fuel cell system is started to a time when an equilibrium is reached between charging and discharging in the secondary battery.

5. The fuel cell system according to claim 4, further comprising an output information detector arranged to detect information concerning an output of the fuel cell, wherein the information concerning the necessary amount of charge includes the information concerning an output of the fuel cell detected by the output information detector.

6. The fuel cell system according to claim 4, further comprising an ambient temperature detector arranged to detect an ambient temperature, wherein the information concerning the necessary amount of charge includes the ambient temperature detected by the ambient temperature detector.

7. The fuel cell system according to claim 4, further comprising a time measurement unit arranged to measure a time elapsed from a time when power generation in the fuel cell is started to a time when an equilibrium is reached between charging and discharging in the secondary battery, wherein the information concerning the necessary amount of charge includes the elapsed time measured by the time measurement unit.

8. The fuel cell system according to claim 1, further comprising a notification unit arranged to notify whether or not power generation in the fuel cell can be stopped in response to the first power generation stopping command from the instruction unit.

9. Transportation equipment comprising the fuel cell system according to claim 1.

10. A method of operating a fuel cell system including a secondary battery charged by a fuel cell, the method comprising the steps of:

after issuing an operation stop command from a main switch during power generation in the fuel cell:
stopping power generation in the fuel cell after the secondary battery is charged to a charge status not lower than a first threshold value under an absence of a first power generation stopping command and a second power generation stopping command from an instruction unit;
stopping power generation in the fuel cell in response to the first power generation stopping command from the instruction unit if the charge status of the secondary battery is lower than the first threshold value and not lower than a second threshold value;
continuing power generation in the fuel cell if the charge status of the secondary battery is lower than the second threshold value such that the secondary battery is charged until the charge status is a value not lower than the second threshold value even if the instruction unit provides the first power generation stopping command; and
stopping power generation in the fuel cell in response to the second power generation stopping command from the instruction unit if the charge status of the secondary battery is lower than the second threshold value.

* * * * *